(12) United States Patent
Jabbour et al.

(10) Patent No.: US 7,871,314 B2
(45) Date of Patent: Jan. 18, 2011

(54) METHOD FOR SHUCKING LOBSTER, CRAB OR SHRIMP

(75) Inventors: Tony Jabbour, Halifax (CA); Gudmundur Hognason, Halifax (CA)

(73) Assignee: Clearwater Seafoods Limited Partnership, Bedford, Nova Scotia (CA)

( * ) Notice: Subject to any disclaimer, the term of this patent is extended or adjusted under 35 U.S.C. 154(b) by 698 days.

(21) Appl. No.: 10/596,254

(22) PCT Filed: Dec. 8, 2004

(86) PCT No.: PCT/CA2004/002090

§ 371 (c)(1), (2), (4) Date: May 31, 2007

(87) PCT Pub. No.: WO2005/055731

PCT Pub. Date: Jun. 23, 2005

(65) Prior Publication Data

US 2007/0254569 A1    Nov. 1, 2007

Related U.S. Application Data

(60) Provisional application No. 60/527,752, filed on Dec. 9, 2003.

(51) Int. Cl.
*A22C 29/02* (2006.01)
(52) U.S. Cl. .......................................................... 452/8
(58) Field of Classification Search ................ 452/8, 452/12–15, 18, 20
See application file for complete search history.

(56) References Cited

U.S. PATENT DOCUMENTS 2,978,334 A * 4/1961 Lapeyre ..................... 426/479
3,217,435 A * 11/1965 Steiert ........................ 40/475
3,471,894 A 10/1969 Tasker
4,313,241 A * 2/1982 Comparetto ................... 452/8
4,383,348 A * 5/1983 Comparetto ................. 452/15
5,679,392 A * 10/1997 Schegan et al. ............. 426/412
6,007,864 A 12/1999 Goodband et al.
6,033,701 A * 3/2000 Hirsch ........................ 426/268
6,086,936 A * 7/2000 Wilson et al. ............... 426/521
6,217,435 B1 * 4/2001 Voisin ......................... 452/12
6,235,338 B1 5/2001 Gallant et al.
6,393,977 B1 * 5/2002 Voisin ......................... 99/467
6,426,103 B2 7/2002 Voisin (Continued)

FOREIGN PATENT DOCUMENTS

CA    2338499    2/2000

(Continued)

OTHER PUBLICATIONS

Chevalier, D. "Comparison of Air-blast And Pressure Shift Freezing On Norway Lobster Quality", Journal of Food Science, (2000) pp. 329-333, vol. 65, No. 2.

(Continued)

*Primary Examiner*—Thomas Price

(57) ABSTRACT

A method for facilitating the removal of the shell of a lobster, crab or shrimp by exposing the lobster, crab or shrimp to pressure for a period of time sufficient to effect detachment of the meat from the shell. Following pressurization, the shell can be easily removed using any available means to provide deshelled raw lobster, crab or shrimp meat.

13 Claims, 1 Drawing Sheet

Attachment Area

U.S. PATENT DOCUMENTS

| | | | |
|---|---|---|---|
| 6,537,601 | B1 * | 3/2003 | Voisin ........................ 426/113 |
| 6,564,533 | B1 | 5/2003 | Voisin |
| 2002/0006465 | A1 | 1/2002 | Voisin |
| 2002/0166877 | A1 | 11/2002 | Voisin |
| 2003/0161917 | A1 | 8/2003 | Voisin |
| 2006/0205332 | A1 | 9/2006 | Raghubeer et al. |

FOREIGN PATENT DOCUMENTS

| | | |
|---|---|---|
| DE | 699 20 715 | 10/2005 |
| ES | 2 229 751 | 4/2005 |
| JP | 04-356156 | 12/1992 |
| JP | 2000157157 A | 6/2000 |
| JP | 2001136900 | 5/2001 |
| WO | WO 99/16759 | 4/1999 |
| WO | WO 00/04785 | 2/2000 |
| WO | WO 00/11127 | 3/2000 |
| WO | WO 03/013279 A2 | 2/2003 |

OTHER PUBLICATIONS

Flick, Dr. George, Jr. "High Hydrostatic Pressure Processing Has Potential", Originally appearing in Global Aquaculture Advocate, (2003) vol. 6, Issue 1 (2 pages), Georgia Tech.

He, H. "Use of High-pressure Processing for Oyster Shucking and Shelf-life Extension", Journal of Food Science, (2002) pp. 640-645, vol. 67. No. 2.

Hockstader, Lee, "Inadvertent Finding Shucks the Use of Hands in Separating Shell" Originally in Washington Post, Sep. 22, 2003 (3 pages).

Hughes, et al., Shellfish News (May 2003) p. 5-63, No. 15, edited by CEFAS on behalf of Defra, Fisheries II Division, UK.

Linton, M., "Changes in the microbiological quality of shellfish, brought about by treatment with high hydrostatic pressure", International Journal of Food Science and Technology, (2003) p. 713-727, vol. 38, Blackwell Publishing.

"Company promotes high-pressure preservation" Microbial Update International, Goliath Business Knowledge on Demand, Jun. 2003 (3 pages).

"High Pressure Processing gets the Spotlight", AP-Foodtechnology.com, Mar. 26, 2003.

Damodaran, Srinivasan, Food Chemistry, $3^{rd}$ ed. (1996: Marcel Dekke, New York), Chapter 6, Section 6.4, p. 353-365.

Bliss, D.E., et al., "Integument, Pigments, and Hormonal Processes", The Biology of Crustacea, (1985) p. 1-11, vol. 9, Academic Press.

Gosling, E., "Bivalve Molluscs Biology, Ecology and Culture", Fishing New Books, p. 7-19. On Order.

Kraeuter, J.N., et al., "Shell Structure and Age Determination", Biology of the Hard Clam, (2001) Chapter 2, p. 53-76, Elsevier Science B.V.

Summers, C.B., "Pressure Tactics", Pacific Fishing, Dec. 2001. On Order.

2002, "Ultrahigh-Pressure Seafood Products", Flow International Corporation.

Federal Court of Canada Court File No. T-570-08 Motion Record dated Jun. 2, 2010.

* cited by examiner

METHOD FOR SHUCKING LOBSTER, CRAB OR SHRIMP

CROSS-REFERENCE TO RELATED APPLICATIONS

This application claims the benefit of U.S. Provisional Patent Application No. 60/527,752 filed Dec. 9, 2003, which is incorporated herein by reference.

FIELD OF THE INVENTION

This application relates to a method of shucking lobster, crab or shrimp, and more particularly to a method for effecting detachment of the shells of lobster, crab or shrimp to facilitate their removal.

BACKGROUND OF THE INVENTION

Lobster, crab and shrimp are invertebrates belonging to the class known as "crustacea". The skeletons of crustaceans are located on the exterior surface of their bodies and are known as exoskeletons. The exoskeleton forms a hard shell which protects the animal from predators. Although rigid, the shells of crustaceans are segmented to permit movement and are softer and more flexible than the shells of bivalve mollusks such as clams or oysters.

The shell of the crustacean is attached to the underlying muscle tissue by a continuous series of intracuticle fibres that extend across the entire animal. These intracuticle fibres extend from the surface of the muscle tissue to the outer surface of the shell via pore canals in the shell. This continuous attachment renders it difficult to remove the shell by manual cutting. Accordingly, a variety of processing means have been developed to weaken the linkages affixing the shell to the body in order to facilitate removal of the shells and retrieval of the meat underneath.

Traditional methods for removing the shells of crustacean shellfish, such as shrimp and lobster, involve cooking the animals prior to peeling. Heat denatures the linkages attaching the exoskeleton to the shellfish meat, thus facilitating removal of the shells. However, following the application of heat, additional means must be employed to separate the meat from the shell. Manual extraction of the meat is time-consuming and laborious while mechanical means often cause the meat to be minced or flaked, thus limiting its potential applications. A further difficulty with using heat to facilitate loosening of the shell is that the shellfish meat underneath inevitably becomes cooked during the process. Cooking of the shellfish meat affects both its flavour and its texture thereby preventing the meat from being used in cuisines requiring raw ingredients, such as sushi. Cooking represents a particular problem in the case of lobsters due to the differing thickness in various parts of the lobster's body. Cooking periods of sufficient length to loosen the shell of the tail of the lobster often result in overcooking of the meat in the smaller sections such as the claws and the legs. The result is reduced flavour and quality in valuable sections of the animal.

Removal of the shells represents a particular problem in the case of lobster meat which is virtually impossible to extract from its shell in the raw state. Chefs requiring raw lobster meat for certain dishes will reduce the cooking time as much as possible by blanching live lobsters to loosen the shells. However, blanching fails to effect complete removal of the shells and still results in some cooking of the surface meat. Restaurants which serve fresh lobster typically maintain the animals in a live state up until the point of cooking and then serve them cooked, but still within the shell. The ability to purchase raw, but deshelled, lobster meat would greatly increase the ease and convenience of serving a variety of fresh lobster dishes.

In the case of shrimp, a common technique for facilitating removal of the shells is to permit the shrimp to "mature" for two to three days following death. During this period, the shell softens thus rendering the shrimp easier to peel. However, this method detracts from the freshness of the shrimp. Accordingly, a need exists for a process to facilitate removal of the shells of crustacean shellfish without heating the animals, and thereby cooking the shellfish meat, or leaving them to mature, thus reducing their freshness.

In recent years, attempts have been made to loosen the shells of raw lobsters by soaking them in chemicals or in enzymes to loosen the connective tissue attaching the shells to the bodies. U.S. Pat. No. 6,235,338 describes a method of removing raw meat from the head-shell of a crustacean shellfish by immersing the animal in a solution of protease enzymes. The same patent also describes an additional method involving freezing of the animal followed by vacuum aspiration. However, these methods have not delivered consistent results and have not been widely adopted by the seafood industry.

In recent years, technology has been developed which has enabled foods to be processed using high pressure treatment. Exposure of foods to high pressure has been most commonly used to eliminate bacteria and other pathogens. High pressure treatment has been used as a preservation method for a variety of different types of foods including meats, fruits and other products. U.S. Pat. No. 6,426,103 (the '103 patent) issued on Jul. 30, 2002, describes the use of high hydrostatic pressure to eliminate pathogenic organisms from raw shellfish. Foods, including seafoods, subjected to high pressure have been shown to maintain a high quality in their texture, taste and appearance.

In addition to the elimination of pathogens, the '103 patent describes release of the meat of oysters which had been subjected to pressure at a minimum of 25,000 psi for a period of 15 minutes at ambient temperature. A similar effect was observed at higher pressures for shorter periods. Oysters are bivalve mollusks having hard shells consisting of two halves. The shell of the oyster is attached to a muscle called an adductor muscle. The '103 patent discloses that, following pressurization, the adductor muscle connective tissue of the oyster was denatured to a gel. As a result, a gap appeared between the two shell halves and the oyster meat slid out without the need for manual cutting. The '103 patent does not suggest that high pressure could be used to facilitate the removal of shells of animals other than oysters.

The physiology of bivalve mollusks is quite distinct from that of crustaceans. As can be observed in FIG. 1, the meat of bivalve mollusks is attached to the shell only at the adductor muscle. By contrast, as can be observed in FIG. 2, the meat of crustacean shellfish is attached to the shell continuously across the body of the animal. Furthermore, the attachment mechanism in crustacean shellfish is complicated by the presence of innervations of external tactile sensory hairs that pass through the shell to the underlying cuticle.

Addressing this point in greater detail, crustaceans such as lobsters and crabs are mobile and hence require muscle structure and function permitting movement. This is achieved by complete and continuous attachment of muscle to the crustacean exoskeleton. In contrast, bivalves (e.g. clams, oysters, mussels and scallops) are either sessile (mussels and oysters), or move by extending a muscular foot from the shell (clams) or by propulsion (scallops). Accordingly, whereas bivalve muscle tissue is attached to the shell only at small discrete points required to close the shell (adductor muscles) or for shell formation (mantle), the majority of the shell of a crustacean possesses muscle attachments.

In lobsters, particularly, the configuration of muscle attachment is much more complex than that in bivalves. Pores are evenly distributed over the surface of the lobster shell. These pores extend through the shell and into the muscle tissue. The resulting complex matrix of pore invaginations into the muscle tissue of the lobster is partly responsible for the difficulty in removing lobster meat from the shell in an uncooked state.

The lobster shell is composed of an epicuticle, procuticle, membranous layer, epidermis and basement membrane. The muscle tissue lies beneath the basement membrane. A highly interdigitated intermediate junction occurs between the epidermis and the muscle tissue. Within the epidermis, conical hemidesomosomes are formed as invaginations of the apical cell membrane, and intracuticular fibers pass form the conical hemidesomosomes into the cuticle. Each hemidesomosome joins a muscle attachment fiber, which extends within a pore canal through the cuticle to the outer epicuticle.

In contrast, bivalve shells consist of three layers: a thin outer periostracum, a mid prismatic layer of aragonite or calcite, and an inner calcareous (nacreous) layer. The middle and inner layers contain thin layers of columnar prisms known as myostraca. The mantle and muscles of the bivalve are attached to the myostraca by strands of connective tissue.

The present invention provides a novel method for effecting detachment of the shells of lobster, crab or shrimp to facilitate their removal. It also provides seafood products obtained using this method.

SUMMARY OF THE INVENTION

In one aspect, the present invention provides a method of facilitating removal of the shells of lobster, crab or shrimp comprising exposing lobster, crab or shrimp to pressure for a period sufficient to effect detachment of the meat from the shell.

In another aspect, the invention provides a seafood product which contains the meat of a lobster, crab or shrimp, which lobster, crab or shrimp has been exposed to pressure for a period of time sufficient to effect detachment of the meat from the shell.

In another aspect, the invention provides a seafood product which contains the meat of a lobster, crab or shrimp, which meat is uncooked and has not been subjected to chemical or enzymatic treatment to effect the removal of the shell.

BRIEF DESCRIPTION OF THE DRAWING

Reference will now be made to the drawings, wherein.

DETAILED DESCRIPTION OF PREFERRED EMBODIMENTS

Figure 1:
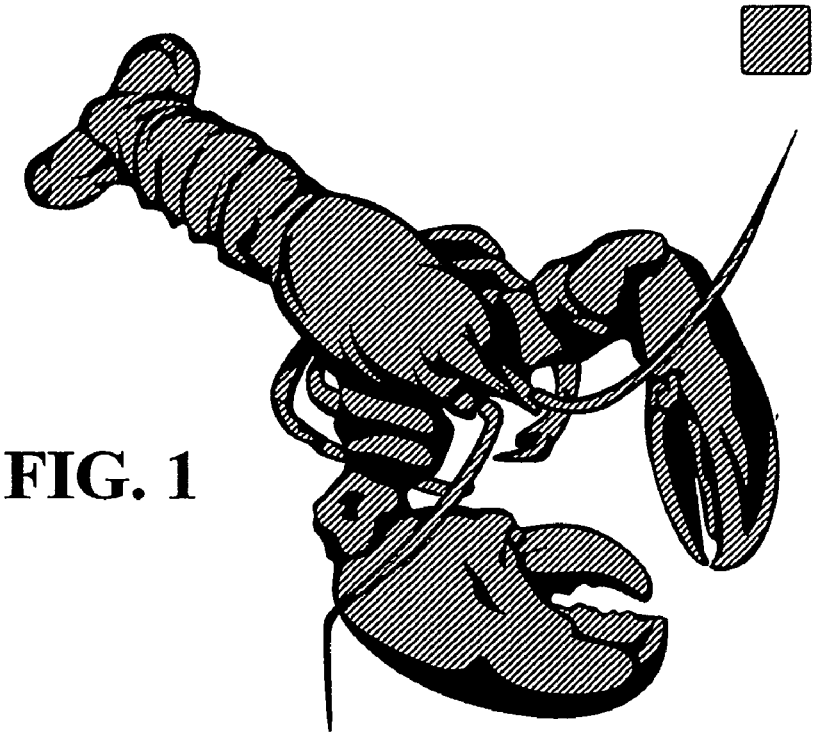
FIG. 1 is a top view of a lobster, the shaded area illustrating the area where the shell is attached to the meat.
Figure 2:
FIG. 2 depicts a bivalve mollusk, the shaded area illustrating the single point of attachment of the shell to the meat at the adductor muscle.

A new method for effecting detachment of the shells of lobster, crab or shrimp will now be described in more detail. According to this method, lobster, crab or shrimp are exposed to pressure for a period of time sufficient to detach the shells so that the shellfish meat can be easily extracted.

Lobster, Crab or Shrimp

The invention has been demonstrated to be useful for removing the shells of shrimp, and also lobster and crab, while leaving the meat substantially intact. The successful application of the methods of the invention to lobster and crab is particularly surprising given the much greater thickness and rigidity of the shells of lobsters and crabs relative to shrimp. Moreover, the muscle fibers of lobsters and crabs are much stronger than those of shrimp. This results in much higher shearing forces during removal of the shells of lobsters and crabs, increasing the difficulty in obtaining intact de-shelled lobster or crab meat.

The invention may be used with lobster, crab or shrimp which are live or dead, whole or cut into pieces, fresh or frozen. As well, it may be combined with other methods for processing seafood including cooking and flavouring, or chemical, enzymatic or heat treatment.

Methods

Lobster, crab or shrimp are exposed to pressure for a period of time sufficient to effect detachment of the body from the shell. The skilled artisan can vary the time and pressure to obtain best results. Generally, detachment can be effected in short periods of time by applying pressure of at least about 25,000 psi. Higher pressures, e.g. about 30,000; 35,000, 40,000; 45,000; 50,000; 55,000; 60,000; 65,000; 70,000; 75,000; 80,000; 85,000; 90,000; 95,000 or 100,000 psi may also be used. Lower pressures, such as about 5,000; 10,000; 15,000; or 20,000 psi may also prove to be sufficient in certain cases. Currently available commercial pressurization equipment is capable of achieving pressures of up to about 100,000 psi, however, pressure greater than this, if achieved, would be effective. For shrimp and lobsters, pressure of at least about 25,000 psi is preferred to achieve detachment in a short period of time. For crab, pressure of at least about 80,000 psi is preferred to achieve detachment in a short period of time.

The amount of exposure time required varies with the amount of pressure applied. Specifically, where a higher pressure is used, a shorter exposure time is required. Exposure times of about 15, 30, 45, 60, 75, 90, 105, 120, 135, 150, 165 or 180 seconds are typical, although longer exposure times can be used.

Any type of externally applied pressure is suitable for use with the subject invention including hydrostatic pressure and isostatic pressure. In addition, the subject invention can be used at any temperature. Typically, the temperature of the meat of the lobster, crab or shrimp is between about 0° C. and about 100° C. when pressure is applied. It is therefore possible to carry out the method of the subject invention at ambient temperature (e.g. about 10° C. to about 30° C., typically about 20° C.), or to combine it with cooling or heating of the lobster, crab or shrimp.

Following pressurization, the shells of lobster, crab or shrimp can be easily separated from the meat using any available means. This can include manual removal of the shells, the use of the mechanical devices, vacuum aspiration, water washing or the use of air pressure.

The term "about" is used above in connection with the discussion of times, temperatures and pressures, as the skilled person will appreciate that exact times, temperatures and pressures are not essential or critical. The term "about" shall be understood to encompass such variations in time, temperature and pressure as may be appropriate in a particular circumstance to effect removal of the shell of a lobster, crab or shrimp and, in any event, shall be understood to encompass ±5%, 10%, 15%, 20% or 25% of the stated value.

Apparatus

Any apparatus capable of applying pressure of at least about 25,000 psi to the shell of a lobster, crab or shrimp may be used in the methods of the invention. However, in some applications equipment capable of producing pressure of as little as about 5000 psi may be useful. Preferred is apparatus that produces hydrostatic pressure. There is a variety of different commercially available equipment that is suitable for use in the methods of the invention including, for example, the hydrostatic pressure equipment described in U.S. Pat. No. 6,537,601 issued Mar. 25, 2003, U.S. Pat. No. 6,426,103 issued Jul. 30, 2002, U.S. Pat. No. 6,393,977 issued May 28, 2002, and U.S. Pat. No. 6,217,435 issued Apr. 17, 2001, all of which are incorporated herein by reference, and which is sold by Flow International Corporation (Kent, Wash., USA) under the trademark FRESHER UNDER PRESSURE.

Applications

The bodies of lobster, crab or shrimp which have been detached from the shells using the method of the subject invention provide meat which is deshelled but uncooked. By the methods of the invention, the meat from the various body parts of the lobster, crab or shrimp can be recovered in a substantially intact form (i.e. whole or large pieces), without the mincing or flaking that results from other extraction methods. Since the meat is uncooked, it can be used by restaurants or consumers in seafood dishes which necessitate little or no cooking. The availability of raw, but deshelled, lobster, crab or shrimp offers chefs and consumers the opportunity to prepare a variety of dishes which were previously impossible to prepare.

The deshelled, raw lobster, crab or shrimp can also be used in foods which are further processed by e.g. freezing, canning or vacuum sealing. It can also be used in a variety of food products which include seafood as an ingredient including e.g. breaded seafood, frozen dinners, and soups.

The invention will now be further illustrated by the following non-limiting examples.

Example 1

Lobsters were tested using pressures of 25,000 psi, 30,000 psi, 40,000 psi, 50,000 psi, 60,000 psi and 87,000 psi. Following pressurization, the meat of the lobster had completely detached from the shells and, as a consequence, it was possible to easily remove the shells manually. Pressure was retained for a sufficient time period to cause the meat to detach from the shell. At 25,000 psi, approximately 120 seconds was sufficient whereas, at 50,000 psi, 45 seconds was sufficient. Tests were performed using both live and dead lobsters with similar results observed for both. The tests were conducted at ambient temperature. One surprising observation was that detachment of the meat from the shell occurred throughout the body of the lobster, with the result that all of the meat could be easily and completely removed from the shell.

In order to evaluate the yield of meat recovered following high pressure treatment, seven different batches of lobster were exposed to high pressure at 35,000 psi for 90 seconds. Yield results are shown in Table 1. As can be observed, the total yield was 29%. Subsequent tests in which the claws, tails and legs of lobsters were isolated showed yields of 54%, 61% and 49% respectively. Lobster meat released from the shells following pressurization treatment showed no evidence of cooking and thus retained the taste and texture of raw lobster meat.

TABLE 1

| Box | Total Green Weight | Claw in Shell | Claw Meat | Tail in Shell | Tail Meat | Legs in Shell | Leg Meat |
|---|---|---|---|---|---|---|---|
| 1 | 29.6 | 9.3 | 7.0 | 9.4 | 8.3 | 1.4 | 1.1 |
| 2 | 30.5 | 6.3 | 0.4 | 4.9 | 9.1 | 1.4 | 1.1 |
| 3 | 30.6 | 7.8 | 2.2 | 5.6 | 9.0 | 1.0 | 0.0 |
| 4 | 29.3 | 5.0 | 5.8 | 3.5 | 0.0 | 1.5 | 0.0 |
| 5 | 30.6 | 8.0 | 7.3 | 8.9 | 0.0 | 2.5 | 0.0 |
| 6 | 29.3 | 3.1 | 0.0 | 5.0 | 0.0 | 0.0 | 0.0 |
| box 7 hardshell | 26.3 | 8.6 | 3.9 | 6.1 | 4.2 | 1.8 | 0.4 |
| Total kgs | 206.2 | 48.2 | 26.6 | 43.4 | 30.6 | 9.5 AV meat yield | 2.7 29.0% |

Example 2

Cold water shrimp were exposed to pressures ranging from 32,500 psi to 47,500 psi for periods ranging from about 15 seconds to about 120 seconds. The tests were conducted at ambient temperature. Following pressurization, the shrimp were peeled to remove the shells, both manually and using mechanical shrimp peeling equipment. Test results showed excellent detachment of shells from the bodies of shrimp which greatly facilitated both manual and mechanical removal of the shells. The method was effective for both live shrimp and dead shrimp.

Example 3

Jonah crab and snow crab were exposed to pressure at 87,000 psi for about 90 seconds at ambient temperature. Following pressurization, the shells of both jonah crab and snow crab were partially released from the bodies. Some manual cutting was required to remove the shells.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

As used in this specification and the appended claims, the singular forms "a," "an," and "the" include plural reference unless the context clearly dictates otherwise. Unless defined otherwise all technical and scientific terms used herein have the same meaning as commonly understood to one of ordinary skill in the art to which this invention belongs.

The invention claimed is:

1. A method of facilitating detachment of meat from the shell of a lobster, said method comprising:
    exposing the lobster to pressure of from 25,000 psi to 50,000 psi for a period of from 15 seconds to 180 seconds at a temperature of between 0° C. and 30° C.

2. The method of claim 1, wherein the pressure is at least about 30,000 psi.

3. The method of claim 1, wherein the pressure is maintained for a period of about 60 seconds.

4. The method of claim 1, wherein said pressure is hydrostatic pressure.

5. The method of claim 1, wherein the lobster is not exposed to heat treatment or chemical or enzymatic treatment before, during or after said exposing to pressure.

6. The method of claim 1, wherein the total yield of lobster meat (total weight of claw, tail and leg meat/total green weight of lobster) is at least about 29%.

7. A seafood product comprising the meat of a lobster which lobster has been subjected to the method of claim 1 to facilitate detachment of meat from the shell of said lobster.

8. A seafood product comprising the meat of a lobster which meat is uncooked and has not been subjected to enzymatic or chemical treatment to effect detachment of the shell of the lobster.

9. The seafood product of claim 8, comprising the meat of a lobster claw with the shell removed, the meat having a yield of at least about 54% (weight claw meat/weight of claw in shell).

10. The seafood product of claim 8, comprising the meat of a lobster tail with the shell removed, the meat having a yield of at least about 61% (weight tail meat/weight of tail in shell).

11. The seafood product of claim 8, comprising the meat of a lobster leg with the shell removed, the meat having a yield of at least about 49% (weight leg meat/weight of leg in shell).

12. The seafood product of claim 7, wherein the meat is detached from the shell in a substantially intact state, without mincing or flaking.

13. The seafood product of claim 7, comprising the meat of a whole lobster with the shell detached.

* * * * *